UNITED STATES PATENT OFFICE.

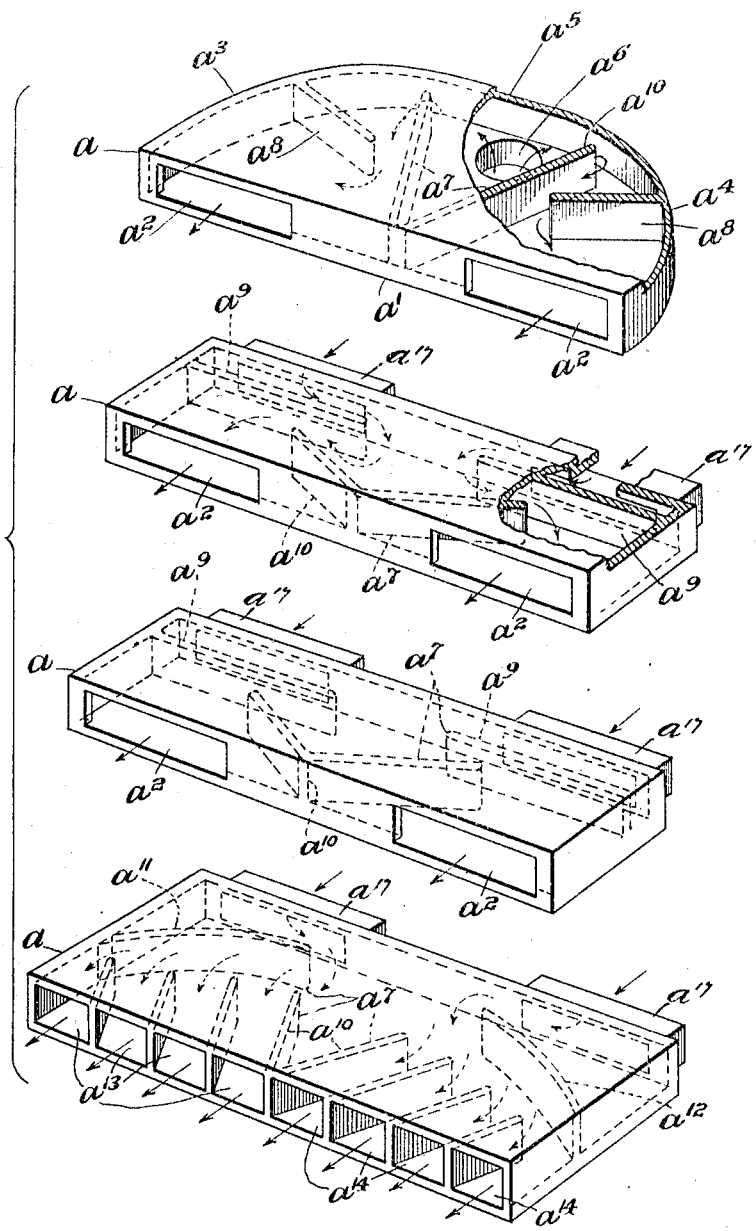

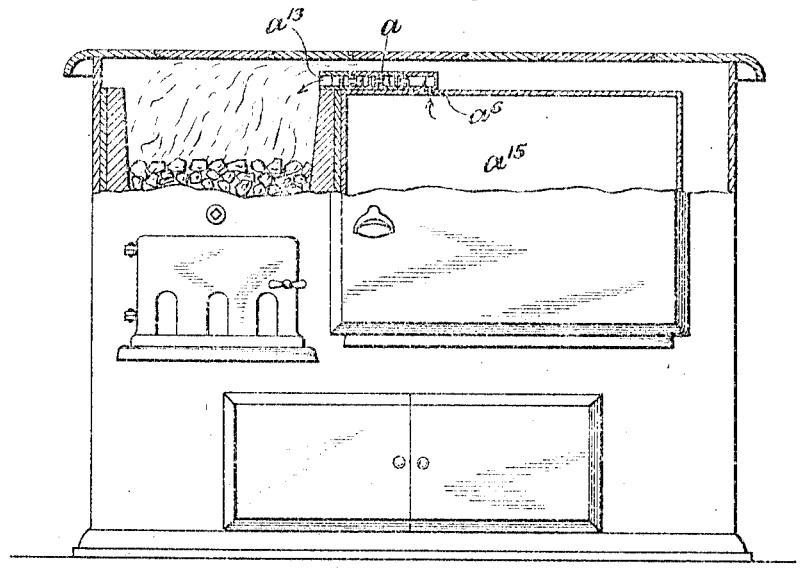
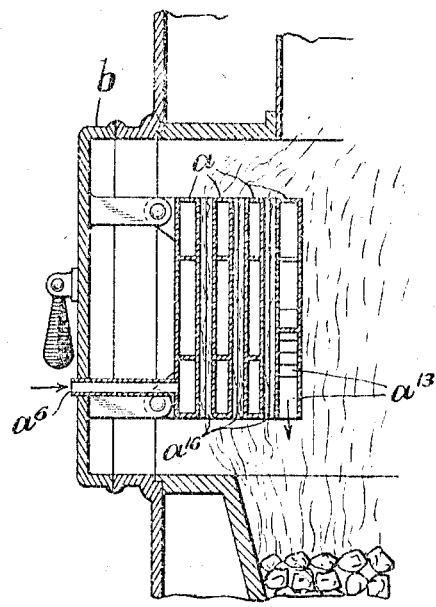

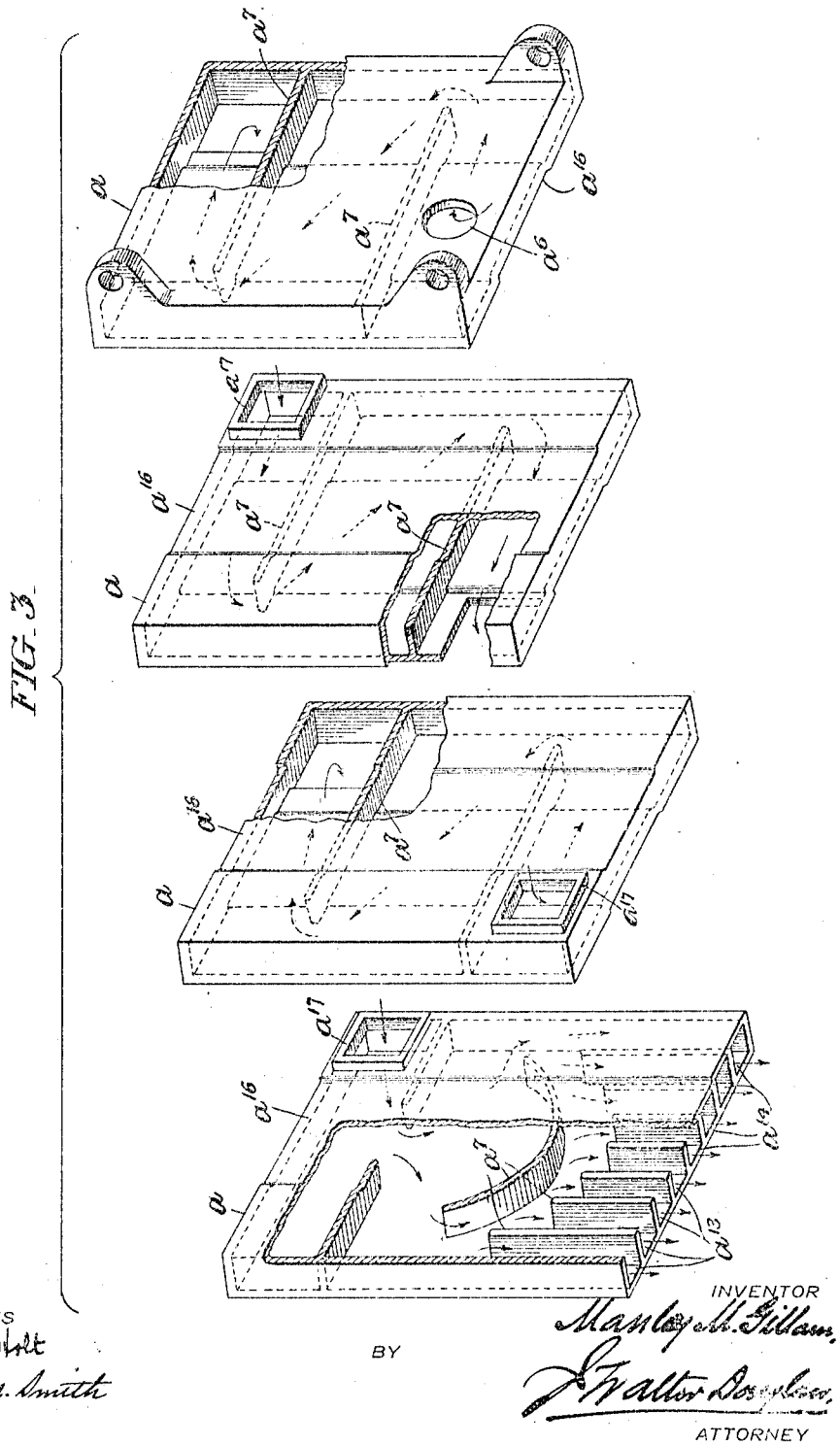

MANLY M. GILLAM, OF FLUSHING, NEW YORK.

ADJUSTABLE HEAT AND FUEL ECONOMIZER.

1,107,605.  Specification of Letters Patent.  Patented Aug. 18, 1914.

Application filed February 20, 1914. Serial No. 819,912.

*To all whom it may concern:*

Be it known that I, MANLY M. GILLAM, a citizen of the United States, residing at Flushing, Long Island, in the county of Queens and State of New York, have invented certain new and useful Improvements in Adjustable Heat and Fuel Economizers for Stoves, Ranges, and Furnaces, of which the following is a specification.

My invention has relation to a heat and fuel economizer consisting of a series of united removable hollow sections having internal partitions or means forming baffles for the coursing air therethrough employed as an economizer in the use of fuel, in stoves, ranges and furnaces, to increase from a given quantity of fuel the combustion of the free carbon released during the burning of such fuel, with attendant heat units to a greater degree conserved and utilized, as well as to an increased degree the gases ordinarily passing off unburnt or unconsumed into the chimney conserved and advantageously utilized in the combustion chamber of the range, stove or furnace, in cooking, baking, house-heating, power purposes, etc.

Under the foregoing defined relation of my invention, it therefore consists, generally stated, in an economizer provided in sectional form, assembled, yet the members readily separated when necessary, and permitting of such a grouping of sections or members as to accommodate the economizer appliance to the varying forces of draft currents as found in different stoves, ranges and furnaces, those of the same make and size and often under apparently similar conditions being found to have strikingly different draft force.

My invention further consists of an appliance, composed of a series of hollow sectional air and gas tight united members partitioned or baffled internally from the inlet member to the outlet member arranged with alley-ways and the said partitioning or baffling arranged to prolong or retard the free passage of air therethrough so as to cause the same in taking circuitous paths of escape to become gradually increasingly heated to the alley-ways through which discharged over the inflamed mass of the combustion chamber and which air so superheated in the one instance is taken from the oven of the stove or range and in the other in its course is acted upon by the inflamed mass of the combustion chamber of the furnace.

In the former instance the appliance is placed so that the inlet is connected directly with the oven of the stove or range for superheating the air passing therethrough and having preferably a damper regulator located in the inlet tube and with the outlet as alley-ways in direct relation with the inflamed mass of the combustion chamber; and in the case of a furnace the appliance, precisely the same in general arrangement, may be attached either to the inside of the fuel door, or to the inside of any convenient portion of the furnace surrounding the combustion chamber, having its inlet arranged to take air from the outside of the said fuel door or from the outside of any other portion of said furnace, and which air, so taken, is thus heated in its passage through the respective assembled sections of the appliance by heat from the inflamed mass of said combustion chamber for cooking, baking, heating, power or other purposes.

My invention further consists of an adjustable economizer appliance constructively arranged in substantially the manner hereinafter described and claimed.

The nature and scope of my present invention will be more fully understood from the following description taken in connection with the accompanying drawings forming part hereof, in which—

Figure 1, is a perspective view of a series of detached sectional hollow members constituting the adjustable economizer appliance of my said invention arranged to be horizontally assembled and to be close to an internal member of the range, as the oven, and so as to be in direct communication with the upper part of the combustion chamber. Fig. 2, is a longitudinal section of a range, showing the economizer appliance of Fig. 1, in application for actual use. Fig. 3, is a perspective view of a series of detached hollow members or sections partly broken away, the said members being arranged to be removably locked to each other in a vertical relationship, when assembled, and each provided with internal partitions forming baffling means for the coursing air in its passage therethrough for being superheated and the said hollow members so arranged as that narrow vertical channelways are formed in the grouping of the said members or sections together, so as to permit the inflamed mass of the combustion chamber to impart its heat to the inbetween walls of the grouped sectional members and thereby to assist in the superheating of the air in its travel therein from the inlet member of the appliance to the outlet member openings or alley-ways thereof, whereat the more or less highly superheated air is discharged into the inflamed fuel of the combustion chamber, to thus quickly and effectively assist in the consumption of the free carbon generated by the firing of the fuel in the said combustion chamber as well as to assist to a marked degree in consuming the gases that hitherto in furnaces, stoves or ranges have passed ordinarily to the chimney unconsumed and wasted; and Fig. 4, is a vertical longitudinal section of a furnace and the combustion chamber door shown closed and with an appliance embodying features of my invention in the form shown in Fig. 3, applied to the inner side of the said door and with the inlet extending to the outside of the same.

Referring to the drawings, $a$, in Figs. 1 and 2, represents the horizontal type of the adjustable economizer appliance, comprising a series of hollow sections or members. The intake member $a^1$, as shown has a square end with openings $a^2$, and the body to the rear is rounded at $a^3$ and $a^4$, and terminating in a slightly flattened part $a^5$. The body is provided with a depending inlet-tube $a^6$. The second and third hollow sections or members are oblong with end openings $a^2$, and with the opposite ends provided with hollow tenons $a^{17}$, to permit of snug fitting in an air and gas tight manner one of the said members with each of the others constituting the said appliance $a$.

Internally of the series of sections or members $a$, are arranged irregular-shaped partitions $a^7$, consisting of oblique partitions as at $a^8$, cross partitions as at $a^9$, and V-shaped partitions as at $a^{10}$, all fully shown in Fig. 1. These internal arrangements provide for baffling air in passage therethrough to the fourth or discharge member $a$, of Fig. 1, wherein the partitions $a^{11}$ and $a^{12}$, are arranged arch-like and beyond are arranged two series of oppositely inclined alley-ways $a^{13}$, and $a^{14}$, to provide discharge outlets for the superheated baffled air from the oven $a^{15}$, of the stove or range and prior to the final discharge of the heated air from the last of the said members directly above the combustion chamber inflamed mass of the stove or range, as clearly shown in Fig. 2, and thus as can be clearly understood, more or less highly heated in its travel prior to being freed through the said alley-ways $a^{13}$ and $a^{14}$, to effect consumption of the free carbon given off by the fuel being burned in the said combustion chamber as well as largely reducing the proportion of unconsumed gases ordinarily passing to the chimney and wasted. There is thus furnished by the use of an economizer in the manner as described a secondary supply of air superheated continually deliverable directly above the inflamed mass of the combustion chamber to give a much greater quantity of heat units as a resultant product from the consumed fuel of the combustion chamber in a given time from a given quantity of fuel consumed.

The internal baffling of the admitted air with the heating of the inbetween and surrounding walls furnishes the very best extraneous conditions for the internal passing air to be superheated by gradually increasing degrees in its course and prior to its discharge into the combustion chamber for the said defined objects or purposes.

With reference to Fig. 3, the series of sections or members of the adjustable appliance $a$, in this instance are arranged vertically as shown in Fig. 4, and in application to the inner side of the furnace door $b$, and with vertical narrow air channel-ways $a^{16}$, provided between certain of them as so assembled, for permitting of the subjecting of such walls to the direct influence of the heat of the inflamed mass of the combustion chamber, as clearly illustrated in Fig. 4, so as additionally to superheat the baffled passing air, and by these walls being maintained in such defined condition to thus insure by such exposure of the air in its coursings to be heated to the very best possible conditions prior to its presentation to the products of the combustion chamber for utilizing the gases therein that otherwise more or less unconsumed as in the past freely escaped into the chimney. The partitions of the respective assembled members are shown in full and dotted outline in Fig. 3. The baffled air finally passing though the alley-ways $a^{13}$ and $a^{14}$, is uniformly heated in its passage and is hottest at the point of discharge through the said alley-ways above the inflamed mass of the combustion chamber and this secondary supply of air, superheated, presented thereto, in its coursing largely increases the ultimate derived heat units of the products of combustion of the burning mass of the said combustion chamber for heating or other purposes.

In Fig. 4, is illustrated a preferred manner of applying the sectionally united appliance $a$, to the inner side of the fuel door of the combustion chamber $b$, detachably secured thereto and having its inlet-tube $a^6$, extending therethrough to the outside thereof. The temporary checking of the air in its passage and causing it to take circuitous paths due to the internal baffling means provided therein as described, enables thus a supply of ideally superheated air to be provided all the time the furnace is in operation, for presentation over the combustion chamber mass thereof. By arranging the appliance in sectional form so that the members to any required number can be readily assembled and secured in an air and gas tight condition to each other for example, as shown and described, is provided an economizer that is suited for any draft whatever the variable surrounding or other conditions may be, thus insuring perfect working of the appliance for supplying an ideal atmosphere for deriving economy in the burning of fuel, with increased heat products obtained from the standpoint of two important aspects, as hereinbefore explained; that is, assurance of the combustion to a greater degree of the free carbon from the fuel of the combustion chamber; and second, a decided diminution in the quantity of gases ordinarily passing to the chimney unconsumed and wasted, for the reason that such free carbon and such gasses by the arrangement of the appliance according to my said invention in the use thereof, as described, the secondary supply of air is heated to such a point as that its oxygen is at once rendered available for inducing desired combustion and this under a regulation practically always automatically controllable by the internal working arrangement of the appliance and always suited to the requirements of the particular stove, range or furnace to which it is applied, because of its sectional features which adapt it to any draft force or other special condition.

It will be manifestly obvious that the internal arrangement of the sectional members as described in the form as well as general shape of the partitions or baffles of the several sections or members of the economizer may be varied, without departing from the spirit or real scope of my said invention; and hence I do not wish to be understood as limiting myself to the precise forms thereof, as illustrated in the accompanying drawings.

It will be observed that in both forms of the sectional members the second and third thereof are alike, while the first and fourth as shown, differ in internal arrangement from each other and from the others from the fact that the first member is provided with the inlet-tube $a^6$, while the fourth member is provided with the series of outlet alley-ways $a^{13}$ and $a^{14}$. The number of members like the second and third used, it will be understood in my economizer, may be increased or decreased according to the draft and general or other conditions of the stove, range or furnace to be provided for.

Having thus described the nature and objects of my invention, what I claim as new and desire to secure by Letters Patent is:—

1. In a heat and fuel economizer, the combination substantially as described, of an intake section and additional sections, one of which is a discharge section, each of the sections having internal obstructions and the intake, the discharge and the intermediate sections differing each from the other and the intermediate section being adapted to be combined with other intermediate sections of like form or with the intake and discharge sections alone, whereby the capacity of the economizer may be varied at will, substantially as set forth.

2. In an adjustable heat and fuel economizer, the combination, substantially as described, of an intake section having internal obstructions, a discharge section having internal obstructions and an intermediate section having internal obstructions, differing each from the other, the intermediate section being adapted to be combined with other intermediate sections of like form or with the intake and discharge sections alone, whereby the capacity of the economizer may be varied at will, for retarding variable draft conditions, and all of the sections, constituting the unit device alining in uniform relationship in their operative position, for the purposes as set forth.

In witness whereof, I have hereunto set my signature in the presence of the two subscribing witnesses.

MANLY M. GILLAM.

Witnesses:
  WALTER E. GILLAM,
  HORACE D. ASHTON.